United States Patent
Weaver (10) Patent No.: US 11,577,513 B2
(45) Date of Patent: Feb. 14, 2023

(54) PHOTOIMAGEABLE NOZZLE MEMBER FOR REDUCED FLUID CROSS-CONTAMINATION AND METHOD THEREFOR

(71) Applicant: Funai Electric Co. Ltd., Osaka (JP)

(72) Inventor: Sean T. Weaver, Lexington, KY (US)

(73) Assignee: Funai Electric Co., Ltd.

(*) Notice: Subject to any disclaimer, the term of this patent is extended or adjusted under 35 U.S.C. 154(b) by 85 days.

(21) Appl. No.: 17/063,942

(22) Filed: Oct. 6, 2020

(65) Prior Publication Data

US 2022/0105724 A1    Apr. 7, 2022

(51) Int. Cl.
*B41J 2/14*    (2006.01)
*B41J 2/16*    (2006.01)

(52) U.S. Cl.
CPC .............. *B41J 2/1433* (2013.01); *B41J 2/162* (2013.01); *B41J 2/1631* (2013.01)

(58) Field of Classification Search
CPC ......... B41J 2/1433; B41J 2/162; B41J 2/1631
See application file for complete search history.

(56) References Cited

U.S. PATENT DOCUMENTS

| | | |
|---|---|---|
| 5,841,452 A | 11/1998 | Silverbrook |
| 6,732,433 B2 | 5/2004 | Sleger |
| 7,134,172 B2 | 11/2006 | Sakamoto et al. |
| 7,527,357 B2 | 5/2009 | Silverbrook |
| 7,571,979 B2 | 8/2009 | Patil et al. |
| 7,654,637 B2 | 2/2010 | Weaver et al. |
| 9,630,419 B2 | 4/2017 | Hong et al. |
| 9,855,566 B1 * | 1/2018 | Craft ...................... B41J 2/1645 |
| 10,112,408 B2 | 10/2018 | Chen et al. |
| 2009/0186293 A1 * | 7/2009 | Fannin .................. G03F 7/0035 430/320 |
| 2009/0244173 A1 * | 10/2009 | Yokouchi ............... B41J 2/1642 347/47 |
| 2010/0128088 A1 * | 5/2010 | Kang ..................... B41J 2/1433 216/11 |

* cited by examiner

Primary Examiner — Jason S Uhlenhake (74) *Attorney, Agent, or Firm* — Luedeka Neely Group, PC (57) ABSTRACT

A nozzle plate of a fluid ejection head for a fluid ejection device, a fluid ejection head containing the nozzle plate, and a method for making the fluid ejection head containing the nozzle plate. The nozzle plate contains two or more arrays of nozzle holes therein and a barrier structure disposed on an exposed surface of the nozzle plate between adjacent arrays of nozzle holes, wherein the barrier structure deters cross-contamination of fluids between the adjacent arrays of nozzle holes.

17 Claims, 10 Drawing Sheets

PHOTOIMAGEABLE NOZZLE MEMBER FOR REDUCED FLUID CROSS-CONTAMINATION AND METHOD THEREFOR

TECHNICAL FIELD

The disclosure is directed to an improved photoimageable nozzle member for fluid ejection devices and methods and structures for reducing cross-contamination of fluids ejected from the fluid ejection devices.

BACKGROUND AND SUMMARY

In the medical field, in particular, there is a need for automated sample preparation for analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures for preparing the samples for analysis may be extremely time consuming. Also, there is a need for accurate preparation of the samples so that the results can be relied on. There are many other situations that require sample preparation in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting is often performed manually or using expensive lab equipment. A relatively inexpensive fluid ejection device has been developed for rapidly and accurately filling wells in a micro-well plate and for preparing slides. The device includes an ejection head that may contain one or more fluids to be dispensed into wells of a micro-well plate or to slides to perform analysis of the samples. One problem associated with the use of a fluid ejection head that dispenses multiple fluids is the likelihood of cross-contamination of fluids on the surface of the ejection head resulting in the ejection of contaminated fluid into the wells of the micro-well plate or onto the slide. Cross-contamination of fluids may cause specific tests to be invalidated or provide false positives and/or negatives. Accordingly, what is needed is a fluid ejection head for a fluid ejection device that reduces or eliminates cross-contamination of fluids ejected from the fluid ejection head.

In view of the foregoing, an embodiment of the disclosure provides a nozzle plate of a fluid ejection head for a fluid ejection device. The nozzle plate contains two or more arrays of nozzle holes therein and a barrier structure disposed on an exposed surface of the nozzle plate between adjacent arrays of nozzle holes, wherein the barrier structure deters cross-contamination of fluids between the adjacent arrays of nozzle holes.

Another embodiment of the disclosure provides a method for making an improved fluid ejection head for fluid ejection device. The method includes applying a first negative photoresist layer to a device surface of a semiconductor substrate, wherein the first negative photoresist layer is derived from a composition comprising a multi-functional epoxy compound, a first di-functional epoxy compound, a photoacid generator devoid of aryl sulfonium salts, an adhesion enhancer, and an aryl ketone solvent. A plurality of flow features are imaged in the first photoresist layer and the imaged photoresist layer is developed to provide the plurality of flow features therein and a substantially planar thick film layer surface. A second negative photoresist layer is applied to the thick film layer surface. The second negative photoresist layer has a thickness ranging from about 10 to about 30 microns and is derived from a second photoresist formulation that includes a second di-functional epoxy compound, a relatively high molecular weight polyhydroxy ether, the photoacid generator devoid of aryl sulfonium salts, the adhesion enhancer, and an aliphatic ketone solvent. A plurality of nozzle holes are imaged in the second photoresist layer to provide at least two arrays of nozzle holes in the second negative photoresist layer. The imaged second photoresist layer is developed to provide a photoresist nozzle plate on the thick film layer. A third negative photoresist layer is applied to an exposed surface of the nozzle plate. The third negative photoresist layer is imaged and developed to provide a barrier structure between adjacent arrays of nozzle holes, whereby cross-contamination of fluids between the adjacent arrays of nozzle holes is deterred.

Another embodiment of the disclosure provides a fluid ejection head for a fluid ejection device. The fluid ejection head includes a nozzle plate having two or more arrays of nozzle holes therein and a barrier structure disposed on an exposed surface of the nozzle plate between adjacent arrays of nozzle holes. The barrier structure deters cross-contamination of fluids between the adjacent arrays of nozzle holes.

In some embodiments, the nozzle plate is made of a photoimageable layer.

In some embodiments, each barrier structure is a single wall imaged in a photoimageable layer laminated to the nozzle plate.

In some embodiments, each barrier structure is made of a plurality of walls imaged in a photoimageable layer laminated to the nozzle plate.

In some embodiments, the barrier structure has a height orthogonal to the nozzle plate ranging from about 25 to about 100 microns.

In some embodiments, the barrier structure is a dry film photoresist layer laminated to the exposed surface of the nozzle plate. In some embodiments, the dry film photoresist layer is a negative photoimageable material layer.

In some embodiments, the exposed surface of the nozzle plate is treated with an oxygen plasma surface treatment and/or alkoxysilane compound prior to laminating a negative photoresist layer to the exposed surface of the nozzle plate, to improve adhesion between the nozzle plate and the negative photoresist layer laminated to the nozzle plate.

DETAILED DESCRIPTION OF EXEMPLARY EMBODIMENTS

Figure 1:
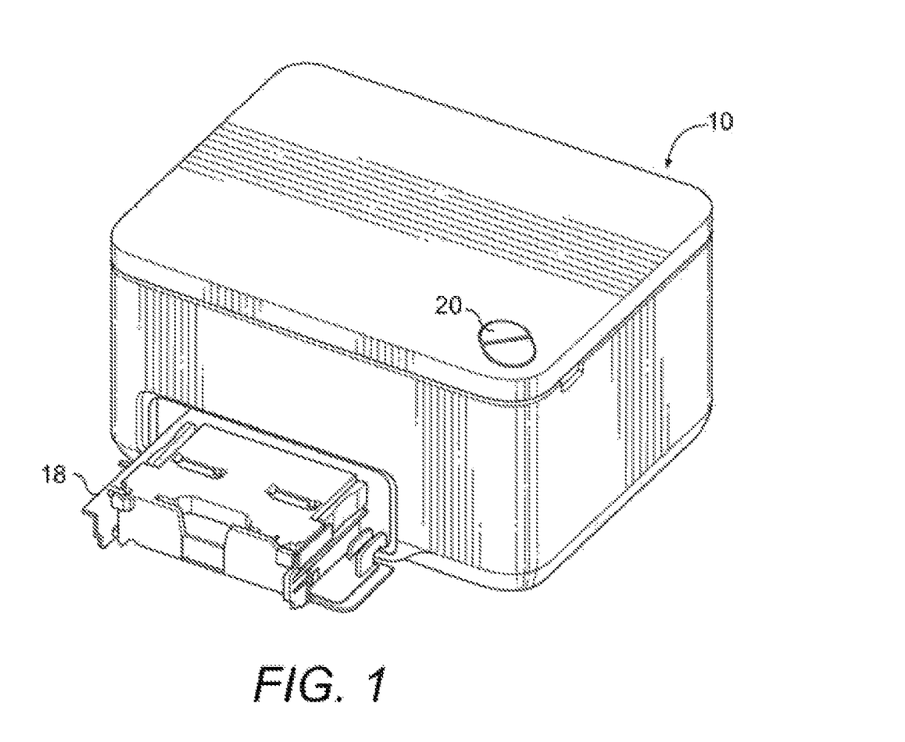
FIG. 1 is a perspective view, not to scale, of a fluid ejection device according to the disclosure.
Figure 2:
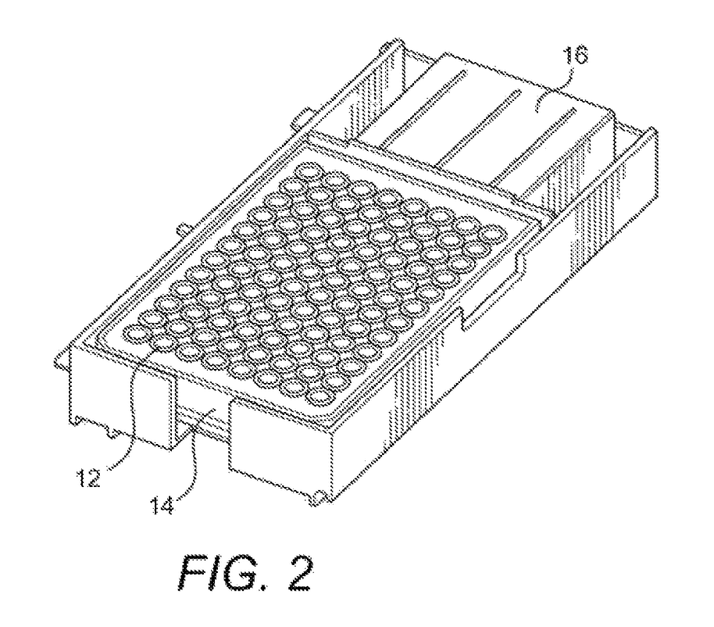
FIG. 2 is a perspective view, not to scale, of a micro-well plate in a tray for use with the fluid ejection device of FIG. 1

The disclosure is directed to improved nozzle plates for fluid ejection heads for fluid dispense devices. The fluid ejection heads may be used in a wide variety of fluid ejection devices including but not limited to printers, and fluid ejection devices 10 (FIG. 1) for depositing one or more fluids into wells 12 of a micro-well plate 14 (FIG. 2) or onto glass slides. The micro-well plate 14 is typically held in a tray 16 that is translated through the fluid dispense device 10 by means of a tray transfer device 18 when the power button 20 is depressed to activate the device 10. The fluid dispense device 10 is configured to deposit one or more fluids into the wells 12 as the well plate 14 is moved through the device 10.

Figure 3:
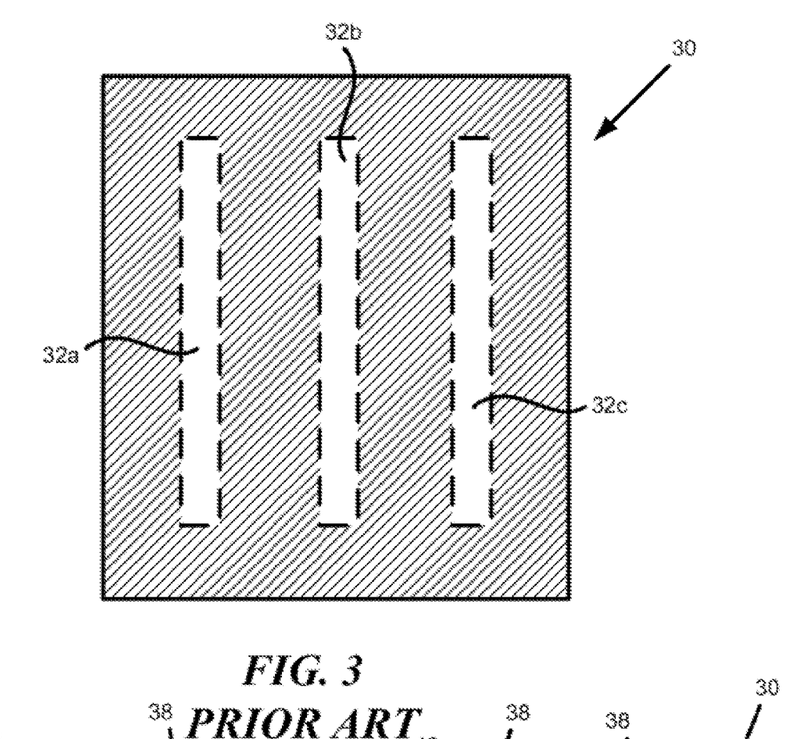
FIG. 3 is a plan schematic view, not to scale, of a prior art fluid ejection head containing three fluid supply vias.
Figure 4:
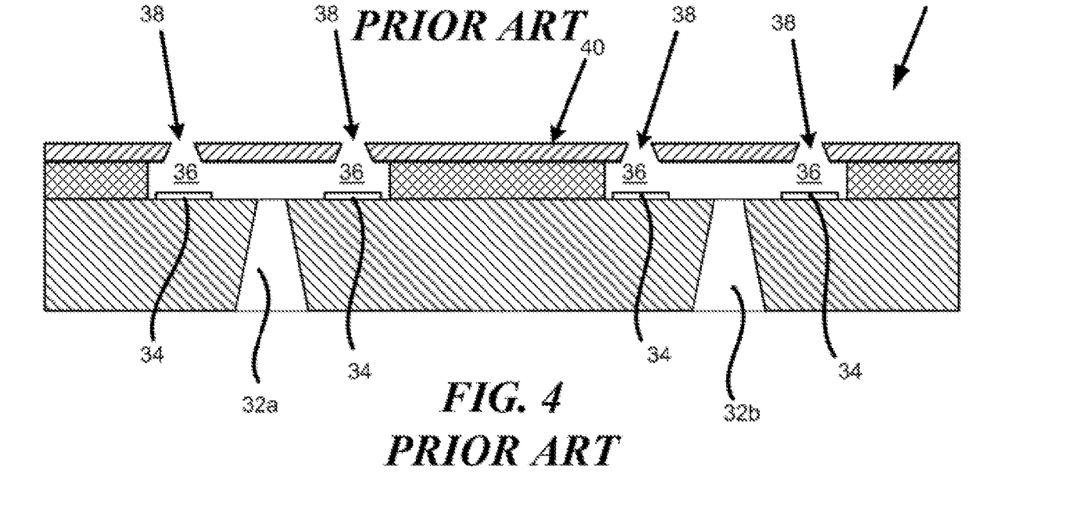
FIG. 4 is a cross-section view, not to scale, of a portion of the prior art fluid ejection head of FIG. 3.

A prior art fluid ejection head 30 is illustrated in a top plan view, somewhat schematically in FIG. 3 and a portion of the prior art fluid ejection head 30 is illustrated in a cross-sectional view in FIG. 4. The fluid ejection head 30 includes three fluid supply vias 32a, 32b and 32c for providing different fluids to arrays of fluid ejectors 34 disposed on opposing sides of each fluid supply via 32a and 32b (FIG. 4). Each fluid ejector 34 is disposed in a fluid chambers 36 below a corresponding nozzle hole 38. Upon activation of the fluid ejectors 34, fluid is dispensed through the nozzle holes 38. As set forth above, when the fluid ejection head is configured with multiply fluid supply vias, fluid contamination is likely to occur across a surface 40 of the ejection head 30 between the arrays of nozzle holes 38.

Figure 5:
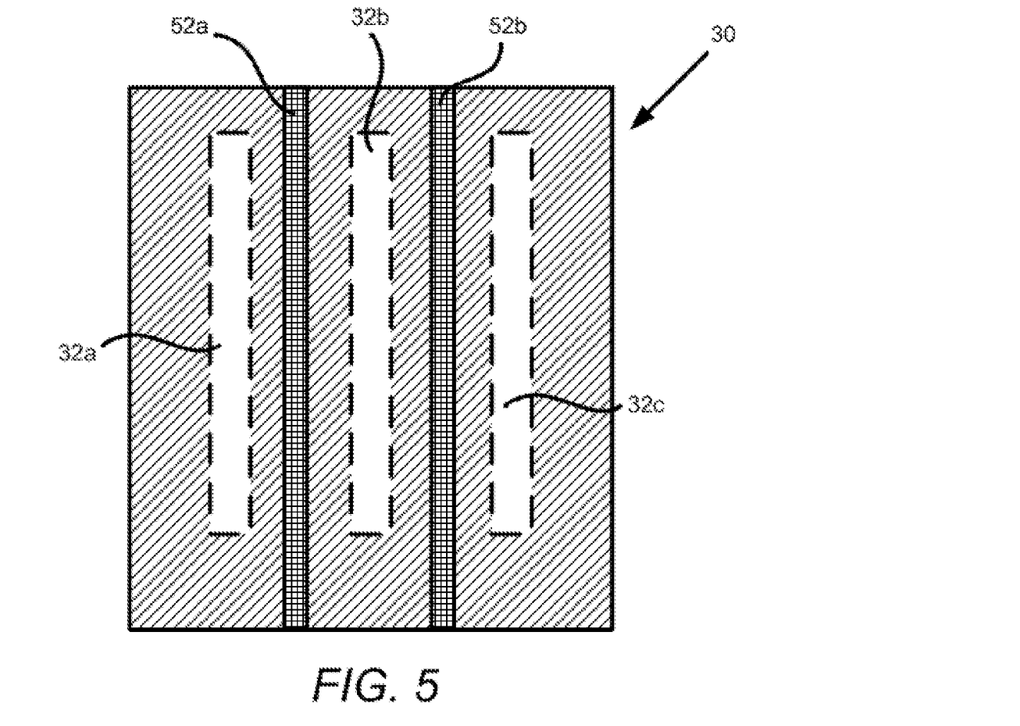
FIGS. 5-6 are plan schematic views, not to scale, of fluid ejection heads containing three fluid supply vias and barrier walls disposed on an exterior surface of the ejection heads.
Figure 6:
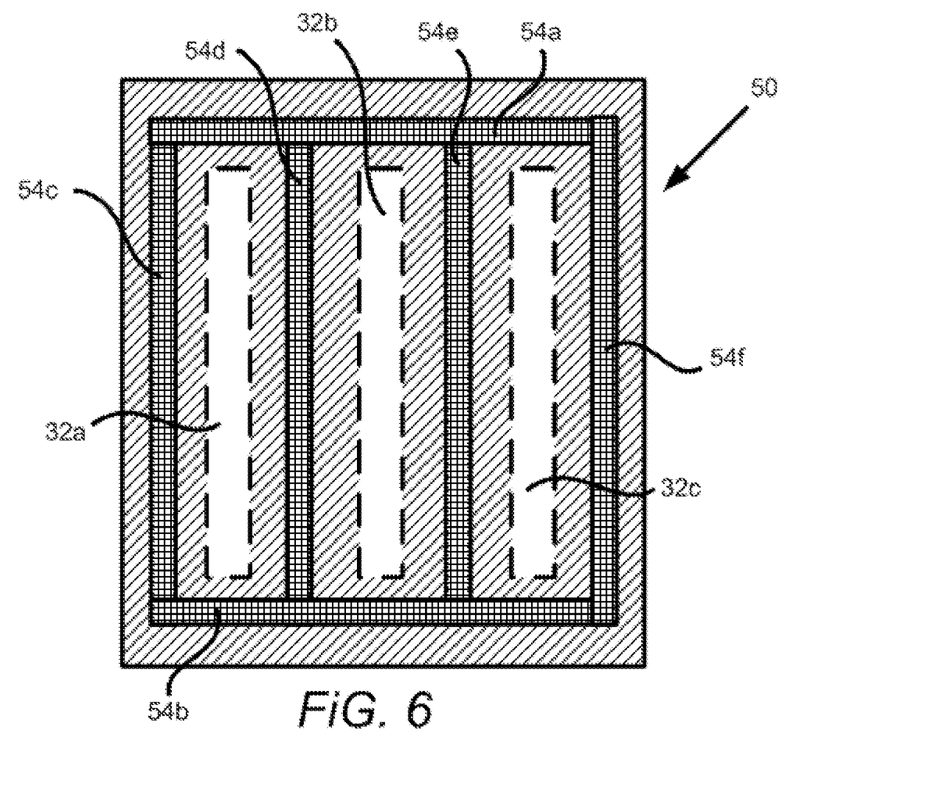

In order to prevent cross-contamination of fluids across the surface of an ejection head 50 having two or more fluid supply vias, such as three fluid supply vias 32a, 32b and 32c, barrier walls 52a and 52b (FIG. 5) may be constructed on the surface of the nozzle plate between the arrays of fluid ejectors and corresponding nozzle holes. FIG. 6 illustrates an ejection head 50 that contains the three fluid supply vias 32a-32c with barrier walls 54a-54f surrounding the nozzles arrays corresponding with each of the fluid supply vias 32a-32c. When barrier walls 54a-54f are used as shown in FIG. 6, there is less chance of fluid flooding the nozzle plate and contacting electrical contact pads on the ejection head. Some fluids used in the fluid ejection device may cause corrosion of the contact pads thereby affecting the functioning of the ejection head.

Figure 7:
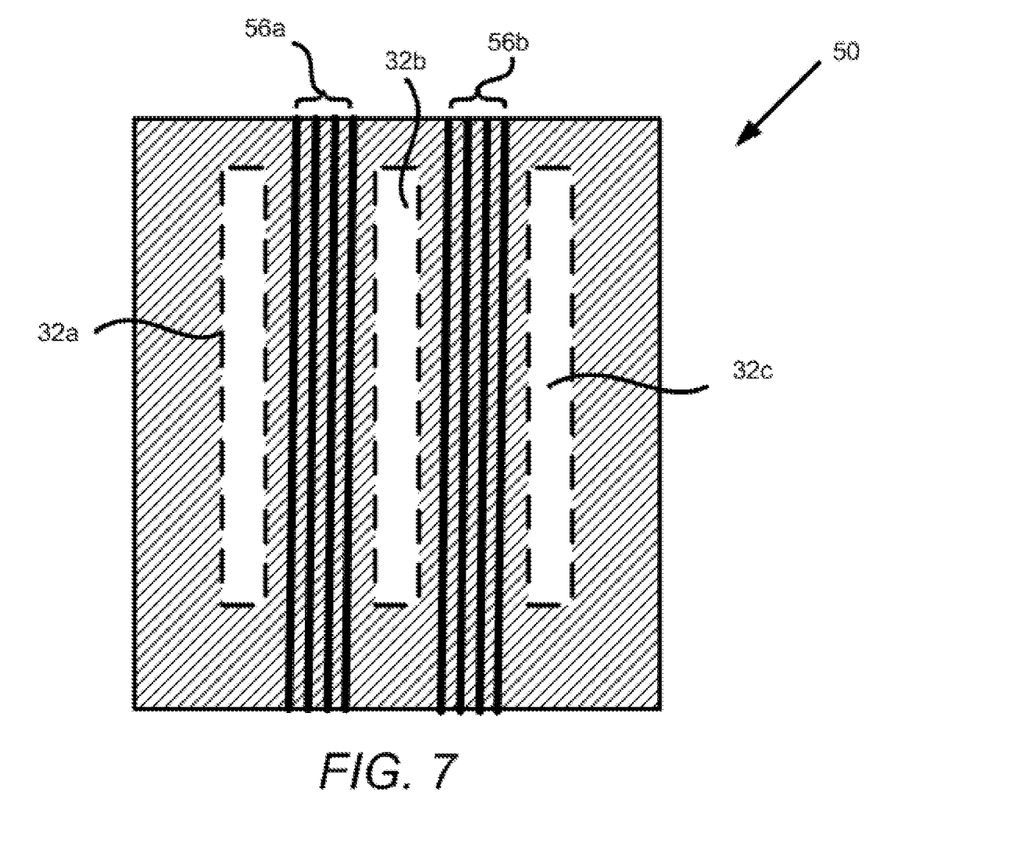
FIG. 7 is a plan schematic view, not to scale, of a fluid ejection head containing three fluid supply vias and a multiple section barrier wall on an exterior surface of the ejection head.

While the foregoing embodiments provide a single barrier wall between the nozzle arrays on a fluid ejection head, it will be appreciated, that the barrier walls may be provided by multiple barrier walls 56a-56b as illustrated in FIG. 7. The multiple barrier walls 56a-56b provide an increase in surface area and length for the liquid to move across the nozzle plate thereby further reducing the possibility of cross contamination of fluid on the surface of the nozzle plate between adjacent arrays of nozzle holes.

Figure 8:
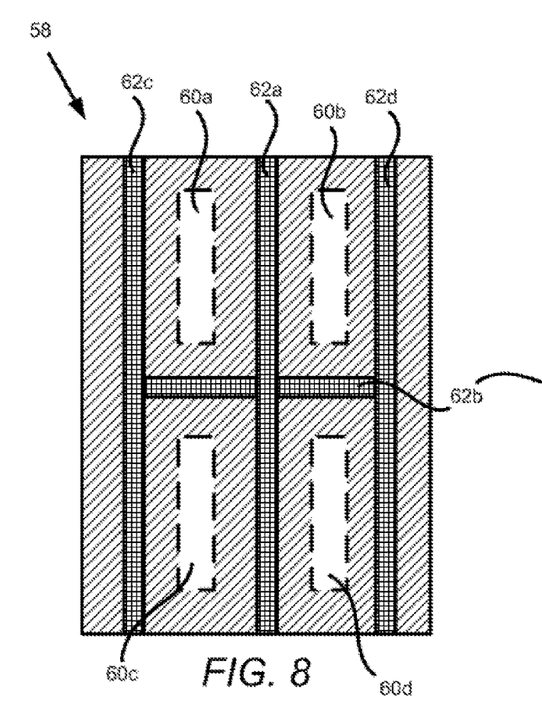
FIGS. 8-9 are plan schematic views, not to scale, of fluid ejection heads containing four fluid supply vias and barrier walls disposed on an exterior surface of the ejection heads.
Figure 9:
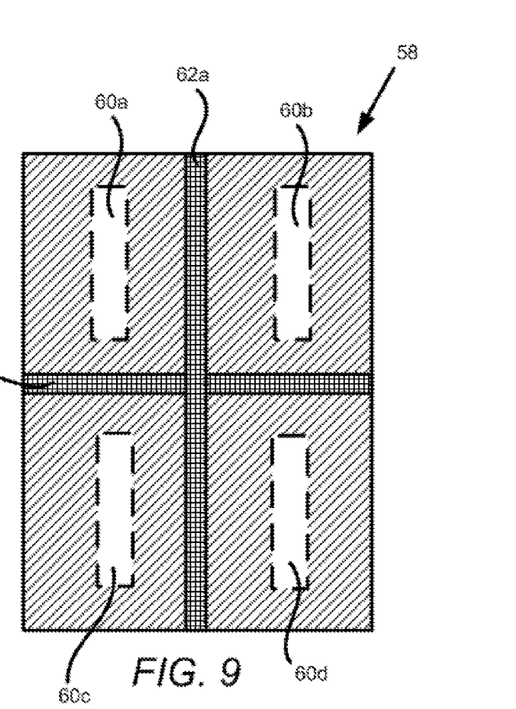

When the fluid ejection head 58 contains four fluid supply vias 60a-60d as illustrated in FIGS. 8 and 9, barrier walls 62a-62d (FIG. 8) or barrier walls 62a-62b may be used to prevent mixing and/or cross-contamination of different fluids on the surface of the nozzle plate. Like FIG. 6, the fluid ejection head 58 of FIG. 8 contains barrier walls 62c and 62d that reduce the chance of fluid flooding the surface of the nozzle plate and contacting electrical contact pads on the ejection head 58.

Figure 10:
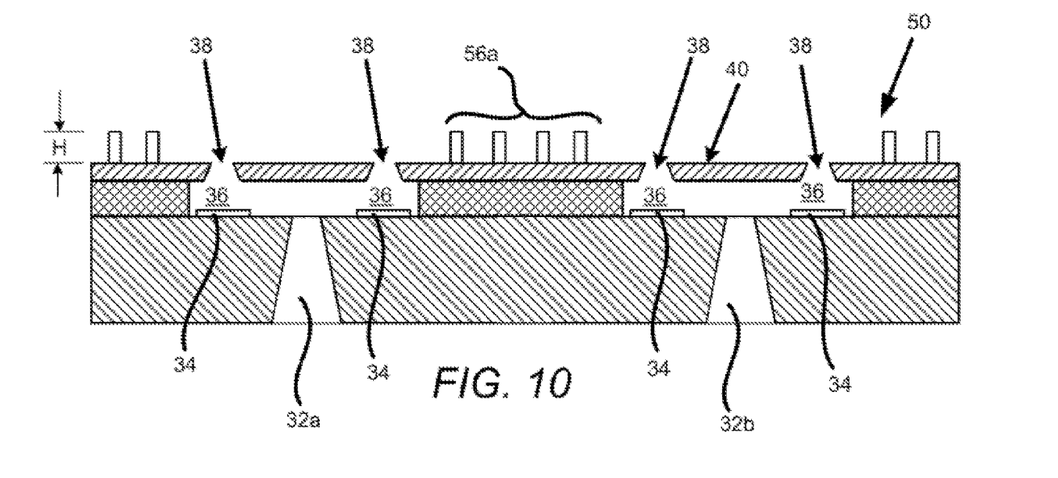
FIG. 10 is a cross-sectional view, not to scale, of a portion of the ejection head of FIG. 7.
Figure 11:
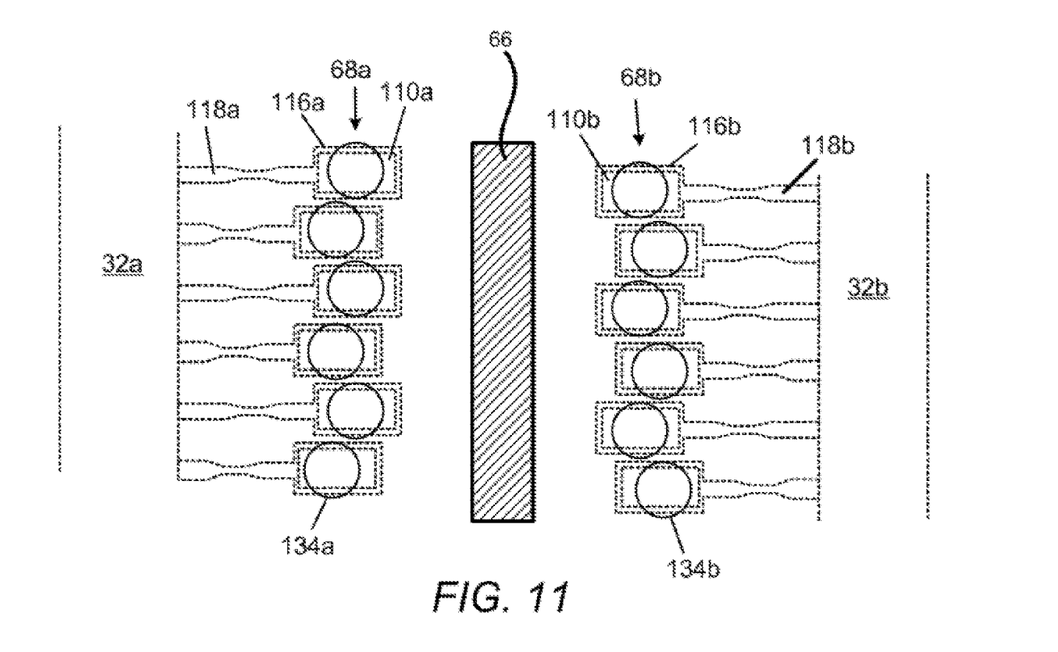
FIG. 11 is a plan view, not to scale, of a portion of a nozzle plate for an ejection head showing a barrier wall between arrays of nozzle holes.

Regardless of the configuration of the barrier walls, each of the barrier walls may have a height (H) that ranges from about 25 microns to about 100 microns (FIG. 10). FIG. 11 illustrates a portion of an ejection head 64 containing a barrier wall 66 disposed between nozzle hole arrays 68a-68b on a surface 40 of a nozzle plate.

With reference now to FIGS. 12-17, a method for making an improved ejection head according to embodiments of the disclosure is illustrated. As a first step in the process, a semiconductor substrate 100 containing fluid ejection devices 110 is provided. A first photoresist material layer 112 is applied to a surface 114 of the substrate 100 by conventional methods such as spin coating or laminating the first photoresist material layer 112 to the surface 114 of the substrate 100.

The first photoresist material layer 112 is derived from a first di-functional epoxy compound, a photoacid generator, a non-reactive solvent, and, optionally, an adhesion enhancing agent. In some embodiments of the disclosure, first photoresist material layer 112 includes a multi-functional epoxy compound, a difunctional epoxy compound, a photoacid generator, a non-reactive solvent, and, optionally, an adhesion enhancing agent.

In the photoresist formulations used for making the first photoresist material layer 112, according to embodiments of the disclosure, the difunctional epoxy component may be selected from difunctional epoxy compounds which include diglycidyl ethers of bisphenol-A (e.g. those available under the trade designations "EPON 1007F", "EPON 1007" and "EPON 1009F", available from Shell Chemical Company of Houston, Tex., "DER-331", "DER-332", and "DER-334", available from Dow Chemical Company of Midland, Mich., 3,4-epoxycyclohexylmethyl-3,4-epoxycyclo-hexene carboxylate (e.g. "ERL-4221" available from Union Carbide Corporation of Danbury, Conn., 3,4-epoxy-6-methylcyclo-hexylmethyl-3,4-epoxy-6-methylcy-clohexene carboxylate (e.g. "ERL-4201" available from Union Carbide Corporation), bis(3,4-epoxy-6-methylcyclohexylmethyl) adipate (e.g. "ERL-4289" available from Union Carbide Corporation), and bis(2,3-epoxycyclopentyl) ether (e.g. "ERL-0400" available from Union Carbide Corporation.

A particularly suitable difunctional epoxy component is a bisphenol-A/epichlorohydrin epoxy resin available from Shell Chemical Company of Houston, Tex. under the trade name EPON resin 1007F having an epoxide equivalent of greater than about 1000. An "epoxide equivalent" is the number of grams of resin containing 1 gram-equivalent of epoxide. The weight average molecular weight of the difunctional epoxy component is typically above 2500, e.g., from about 2800 to about 3500 weight average molecular weight in Daltons. The amount of difunctional epoxy component in the photoresist formulation may range from about 30 to about 95 percent by weight based on the weight of the cured resin.

The photoresist formulation according to embodiments of the disclosure also include a photoacid generator. The photoacid generator may be selected from a compound or mixture of compounds capable of generating a cation such as an aromatic complex salt which may be selected from onium salts of a Group VA element, onium salts of a Group VIA element, and aromatic halonium salts. Aromatic complex salts, upon being exposed to ultraviolet radiation or electron beam irradiation, are capable of generating acid moieties which initiate reactions with epoxides. The photoacid generator may be present in the photoresist formulation in an amount ranging from about 0.5 to about 15 weight percent based on the weight of the cured resin.

Examples of triaryl-substituted sulfonium complex salt photoinitiators which may be used in the formulations according to an embodiment of the disclosure include, but are not limited to:

triphenylsulfonium tetrafluoroborate
triphenylsulfonium hexafluorophosphate
triphenylsulfonium hexafluoroantimonate
tritolysulfonium hexafluorophosphate
anisyldiphenylsulfonium hexafluoroantimonate
4-butoxyphenyldiphenylsulfonium tetrafluoroborate
4-chlorophenyidiphenylsulfonium hexafluoroantimonate
4-acetoxy-phenyldiphenylsulfonium tetrafluoroborate
4-acetamidophenyldiphenylsulfonium tetrafluoroborate Of the triaryl-substituted sulfonium complex salts which are suitable for use in the photoresist formulations, the most preferred salt is a mixture of triarylsulfonium hexafluoroantimonate salt, commercially available from Union Carbide Corporation under the trade name CYRACURE UVI-6974.

In the another embodiment of the disclosure, the first photoresist formulation also contains the multifunctional epoxy component. A suitable multifunctional epoxy component for making the photoresist formulation according to a second embodiment of the disclosure, may be selected from aromatic epoxides such as glycidyl ethers of polyphenols. A particularly preferred multifunctional epoxy resin is a polyglycidyl ether of a phenolformaldehyde novolac resin such as a novolac epoxy resin having an epoxide gram equivalent weight ranging from about 190 to about 250 and a viscosity at 130° C. ranging from about 10 to about 60 poise which is available from Resolution Performance Products of Houston, Tex. under the trade name EPON RESIN SU-8.

The multi-functional epoxy component of the first photoresist formulation according to the disclosure has a weight average molecular weight of about 3,000 to about 5,000 as determined by gel permeation chromatography, and an average epoxide group functionality of greater than 3, preferably from about 6 to about 10. The amount of multifunctional epoxy resin in the photoresist formulation according preferably ranges from about 30 to about 50 percent by weight based on the weight of the cured thick film layer 80.

As in the embodiment described above, the first photoresist formulation also contains a photoacid generator. The photoacid generator may be selected from a compound or mixture of compounds capable of generating a cation such as an aromatic complex salt which may be selected from onium salts of a Group VA element, onium salts of a Group VIA element other than sulfur, and aromatic halonium salts. Of the aromatic complex salts which are suitable for use in exemplary photoresist formulation according to the disclosure, suitable salts are di- and triaryl-substituted iodonium salts which are substantially devoid of aryl sulfonium salts. Examples of aryl-substituted iodonium complex salt photoacid generates include, but are not limited to:

diphenyliodonium trifluoromethanesulfonate,
(p-tert-butoxyphenyl)phenyliodonium trifluoromethanesulfonate,
diphenyliodonium p-toluenesulfonate,
(p-tert-butoxyphenyl)-phenyliodonium p-toluenesulfonate,
bis(4-tert-butylphenyl)iodonium hexafluorophosphate, and
diphenyliodonium hexafluoroantimonate.

The most preferred iodonium salt for use as a photoacid generator for the formulations of the second embodiment described herein is a mixture of diaryliodonium hexafluoroantimonate salts, commercially available from Sartomer Company, Inc. of Exton, Pa. under the trade name SARCAT CD 1012.

The first photoresist formulations of the described herein may optionally include an effective amount of an adhesion enhancing agent such as a silane compound. Silane compounds that are compatible with the components of the photoresist formulation typically have a functional group capable of reacting with at least one member selected from the group consisting of the multifunctional epoxy compound, the difunctional epoxy compound and the photoinitiator. Such an adhesion enhancing agent may be a silane with an epoxide functional group such as a glycidoxyalkyltrialkoxysilane, e.g., gamma-glycidoxypropyltrimethoxysilane. When used, the adhesion enhancing agent is preferably present in an amount ranging from about 0.5 to about 5 weight percent and preferably from about 0.9 to about 4.5 weight percent based on total weight of the cured resin, including all ranges subsumed therein. Adhesion enhancing agents, as used herein, are defined to mean organic materials soluble in the photoresist composition which assist the film forming and adhesion characteristics of the first photoresist material layer 112 on the surface 114 of the substrate 100.

In order to provide the first photoresist material layer 112 on the surface 114 of the substrate 100 (FIG. 12), a suitable solvent is used. A suitable solvent is a solvent which is preferably non-photoreactive. Non-photoreactive solvents include, but are not limited gamma-butyrolactone, $C_{1-6}$ acetates, tetrahydrofuran, low molecular weight ketones, mixtures thereof and the like. A particularly preferred non-photoreactive solvent is acetophenone. The non-photoreactive solvent is present in the formulation mixtures used to provide the first photoresist material layer 112 in an amount ranging of from about 20 to about 90 weight percent, preferably from about 40 to about 60 weight percent, based on the total weight of the photoresist formulation. The non-photoreactive solvent preferably does not remain in the cured layer 112 and is thus is removed prior to or during the curing steps for layer 112.

According to a preferred procedure, non-photoreactive solvent and difunctional epoxy compound are mixed together in a suitable container such as an amber bottle or flask and the mixture is put in a roller mill overnight at about 60° C. to assure suitable mixing of the components. After mixing the solvent and difunctional epoxy compound, the multifunctional epoxy compound, if used, is added to the container and the resulting mixture is rolled for two hours on a roller mill at about 60° C. The other components, the photoacid generator and the adhesion enhancing agent, are also added one at a time to the container and the container is rolled for about two hours at about 60° C. after adding all of the components to the container to provide a wafer coating mixture.

The photoresist formulations and resulting first photoresist material layer 112 described herein are substantially devoid of acrylate or methacylate polymers and nitrile groups. Without desiring to be bound by theory, it is believed that the higher molecular weight difunctional epoxy material contributes sufficient thermoplastic properties to the layer 112 to enable use of a photocurable formulation that is substantially devoid of acrylate or methacrylate polymers and nitrile rubber components. Additionally, a photoresist formulation, substantially devoid of acrylate or methacrylate polymers, may have an increased shelf life as compared to the same photoresist formulation containing acrylate or methacrylate polymers.

In order to apply the photoresist formulation described above to the surface 114 of the substrate 100 (FIG. 12), a silicon substrate wafer 100 is centered on an appropriate sized chuck of either a resist spinner or conventional wafer resist deposition track. The first photoresist formulation mixture is either dispensed by hand or mechanically into the center of the wafer. The chuck holding the wafer is then rotated at a predetermined number of revolutions per minute to evenly spread the mixture from the center of the wafer to the edge of the wafer. The rotational speed of the wafer may be adjusted or the viscosity of the coating mixture may be altered to vary the resulting thickness of the layer 112. Rotational speeds of 2500 rpm or more may be used. The amount of photoresist formulation applied to surface 114 of the substrate 100 should be sufficient to provide the a layer 112 having the desired thickness for flow features imaged therein. Accordingly, the thickness of layer 112 after curing may range from about 10 to about 25 microns or more.

The resulting silicon substrate wafer containing the layer 112 is then removed from the chuck either manually or mechanically and placed on either a temperature controlled hotplate or in a temperature controlled oven at a temperature of about 90° C. for about 30 seconds to about 1 minute until the material is "soft" baked. This step removes at least a portion of the solvent from the layer 112 resulting in a partially dried film on the surface 114 of the substrate 100. The wafer is removed from the heat source and allowed to cool to room temperature.

Prior to imaging and developing the layer 112, the fluid feed slot 32a is formed in the substrate 100, such as by an etching process. An exemplary etching process is a dry etch process such as deep reactive ion etching or inductively coupled plasma etching. During the etching process, the layer 112 acts as an etch stop layer.

In order to define flow features in the first photoresist material layer 112 such as a fluid chamber 116 and fluid supply channel 118, the layer 112 is masked with a mask 120 containing substantially transparent areas 122 and substantially opaque areas 124 thereon. Areas of the layer 112 masked by the opaque areas 124 of the mask 120 will be removed upon developing to provide the flow features described above.

Figure 12:
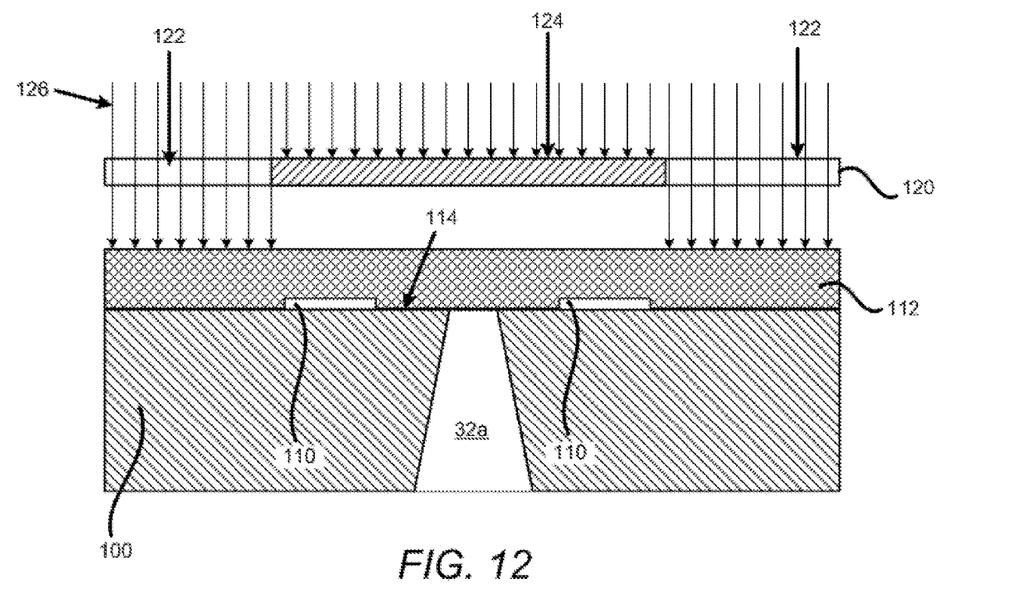
FIGS. 12-17 are cross-section views, not to scale, illustrating steps for making an ejection head according to embodiments of the disclosure.

In FIG. 12, a radiation source provides actinic radiation indicated by arrows 126 to image the layer 112. A suitable source of radiation emits actinic radiation at a wavelength within the ultraviolet and visible spectral regions. Exposure of the layer 112 may be from less than about 1 second to 10 minutes or more, preferably about 5 seconds to about one minute, depending upon the amounts of particular epoxy materials and aromatic complex salts being used in the formulation and depending upon the radiation source, distance from the radiation source, and the thickness of the layer 112. The layer 112 may optionally be exposed to electron beam irradiation instead of ultraviolet radiation.

The foregoing procedure is similar to a standard semiconductor lithographic process. The mask 120 is a clear, flat substrate usually glass or quartz with opaque areas 124 defining the areas to be removed from the layer 112 (i.e. a negative acting photoresist layer). The opaque areas 124 prevent the ultraviolet light from cross-linking the layer 112 masked beneath it. The exposed areas of the layer 112 provided by the substantially transparent areas 122 of the mask 120 are subsequently baked at a temperature of about 90° C. for about 30 seconds to about 10 minutes, preferably from about 1 to about 5 minutes to complete the curing of the layer 112.

Figure 13:
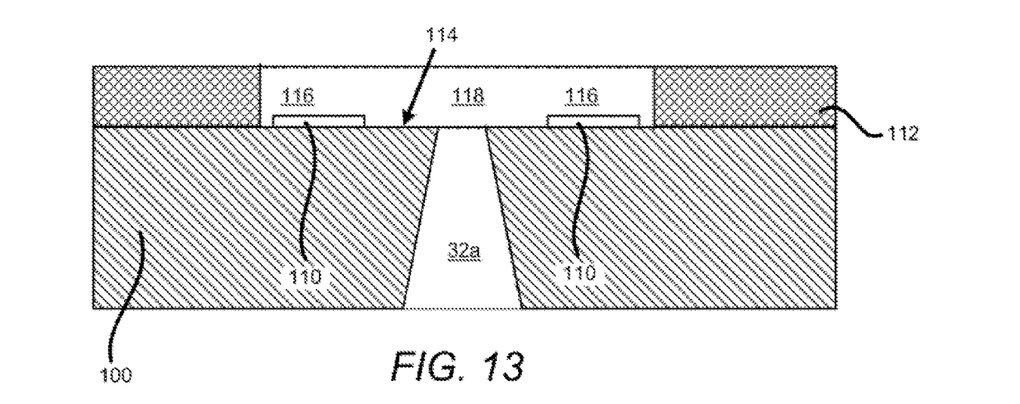

The non-imaged areas of the layer 112 are then solubilized by a developer and the solubilized material is removed leaving the imaged and developed layer 112 on the surface 114 of the substrate 100 as shown in FIG. 13. The developer comes in contact with the substrate 100 and layer 112 through either immersion and agitation in a tank-like setup or by spraying the developer on the substrate 100 and layer 112. Either spray or immersion will adequately remove the non-imaged material. Illustrative developers include, for example, butyl cellosolve acetate, a xylene and butyl cellosolve acetate mixture, and $C_{1-6}$ acetates like butyl acetate.

Exemplary formulations for making the first photoresist material layer 112 are illustrated in the following tables:

TABLE 1

| Component | Amount in cured first layer (wt. %) |
|---|---|
| Difunctional epoxy component (EPON 1007F) | 42.0 |
| 4-phenyl sulfide) phenyl diphenylsulfonium hexafluoroantimonate (CYRACURE 6974) | 15.0 |
| Glycidoxypropyltrimethoxysilane (Z-6040) | 0.93 |
| Acetophenone | 42.07 |

TABLE 2

| Component | Amount in cured first layer (wt. %) |
|---|---|
| Difunctional epoxy component (EPON 1007F) | 20.25 |
| Multifunctional epoxy component (EPON SU-8) | 20.25 |
| Diaryliodoniumhexafluoroantimonate (SARCAT 1012) | 8.9 |
| Glycidoxypropyltrimethoxysilane (Z-6040) | 0.6 |
| Acetophenone | 50.0 |

TABLE 3

| Component | Amount in cured thick film layer (wt. %) |
|---|---|
| Difunctional epoxy component (EPON 1007F) | 44.3 |
| 4-phenyl sulfide) phenyl diphenylsulfonium hexafluoro-antimonate (CYRACURE 6974) | 0.9 |
| Glycidoxypropyltrimethoxysilane (Z-6040) | 2.4 |
| Acetophenone | 52.4 |

Figure 14:
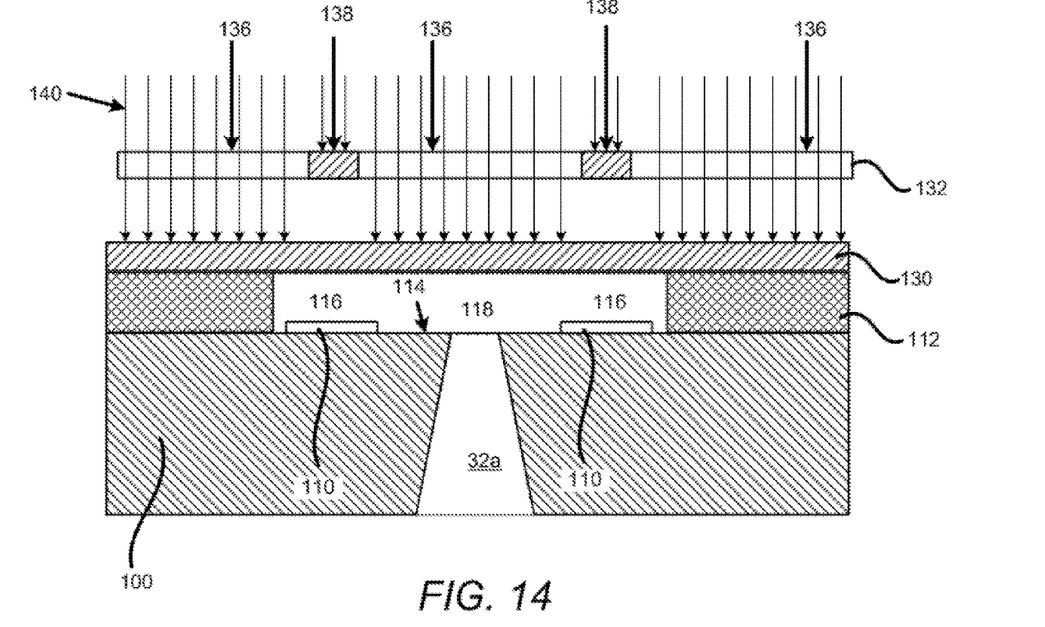

With reference now to FIG. 14, subsequent to imaging and developing the first photoresist material layer 112, a second photoresist material layer 130 is laminated to the first layer 112. The second photoresist material layer 130 is provided by a dry film photoresist material derived from a di-functional epoxy compound, a relatively high molecular weight polyhydroxy ether, the photoacid generator described above, and, optionally, the adhesion enhancing agent described above.

The di-functional epoxy compound used for providing the second photoresist material layer 130, includes the first di-functional epoxy compound described above, having a weight average molecular weight typically above 2500 Daltons, e.g., from about 2800 to about 3500 weight average molecular weight in Daltons.

In order to enhance the flexibility of the second photoresist material layer 130 for lamination purposes, a second di-functional epoxy compound may be included in the formulation for the second layer 130. The second di-functional epoxy compound typically has a weight average molecular weight of less than the weight average molecular weight of the first di-functional epoxy compound. In particular, the weight average molecular weight of the second di-functional epoxy compound ranges from about 250 to about 400 Daltons. Substantially equal parts of the first di-functional epoxy compound and the second di-functional epoxy compound are used to make the second photoresist layer 130. A suitable second di-functional epoxy compound may be selected from diglycidyl ethers of bisphenol-A available from DIC Epoxy Company of Japan under the trade name DIC 850-CRP and from Shell Chemical of Houston, Tex. under the trade name EPON 828. The total amount of di-functional epoxy compound in the second photoresist material layer 130 ranges from about 40 to about 60 percent by weight based on the total weight of the cured layer 130. Of the total amount of di-functional epoxy compound in the layer 130, about half of the total amount is the first di-functional epoxy compound and about half of the total amount is the second di-functional epoxy compound.

Another component of the second photoresist material layer 130 is a relatively high molecular weight polyhydroxy ether compound of the formula:

[OC$_6$H$_4$C(CH$_3$)$_2$C$_6$H$_4$OCH$_2$CH(OH)CH$_2$]$_n$ having terminal alpha-glycol groups, wherein n is an integer from about 35 to about 100. Such compounds are made from the same raw materials as epoxy resins, but contain no epoxy groups in the compounds. Such compounds are often referred to as phenoxy resins. Examples of suitable relatively high molecular weight phenoxy resins include, but are not limited to, phenoxy resins available from InChem Corporation of Rock Hill, S.C. under the trade names PKHP-200 and PKHJ. Such phenoxy compounds have a solids content of about 99 weight percent, a Brookfield viscosity at 25° C. ranging from about 450 to about 800 centipoise, a weight average molecular weight in Daltons ranging from about 50,000 to about 60,000, a specific gravity, fused at 25° C., of about 1.18, and a glass transition temperature of from about 90° to about 95° C.

Phenoxy resins are particularly useful in making the second photoresist layer 94, partially because they often do not crystallize or build up stress concentrations. Phenoxy resins have high temperature characteristics that enable stability over a wide temperature range including temperatures above about 38° C. The second photoresist material layer 130 contains from about 25 to about 35 percent by weight phenoxy resin based on the weight of the cured second layer 130.

As with the photoresist material for the first layer 112, the second photoresist material layer 130 includes the photoacid generator described above, and, optionally, the adhesion enhancing agent described above. The amount of the photoacid generator ranges from about 15 to about 20 by weight based on the weight of the cured layer 130, and the adhesion enhancing agent, when used, ranges from about 0.05 to about 1 percent by weight based on the weight of the cured second layer 130.

The second photoresist material layer 130 is applied as a dry film laminate to the first photoresist material layer 112 after curing and developing the first layer 112. Accordingly, the foregoing components of the second photoresist material layer 130 may be dissolved in a suitable solvent or mixture of solvents and dried on a release liner or other suitable support material. A solvent in which all of the components of the second photoresist material layer 130 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer 130.

Figure 15:
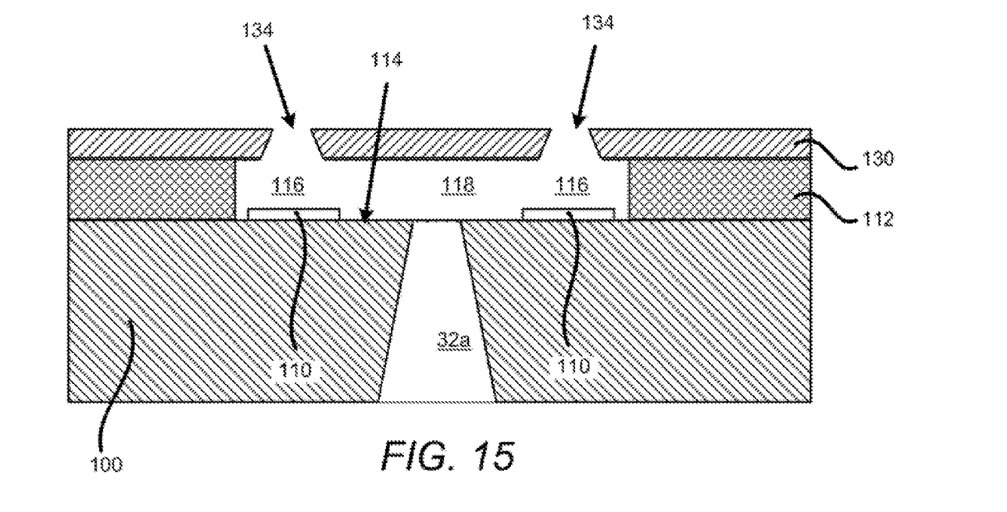

With reference to FIGS. 14 and 15, a method for making an ejection head 50 containing the second photoresist material layer 130 will now be described. According to the method, the second photoresist material layer 130 is laminated to the imaged and developed first photoresist material layer 112 (FIG. 14). The second photoresist material layer 130 may be laminated to the first layer 112 using heat and pressure. Next a mask 132 is used to define the nozzle holes 134 in the second photoresist layer 130. As described above, the mask 132 includes transparent areas 136 and opaque areas 138 defining the nozzle holes 134 in the second layer 130 The opaque areas 138 prevent actinic radiation indicated by arrow 140 from contacting the second layer 130 in an area which will provide the nozzle hole 134, while the remainder of the second layer 130 is cured by the actinic radiation. Upon developing the second photoresist material layer 130 with a suitable solvent as described above, the nozzle holes 134 are formed in the second photoresist layer as shown in FIG. 15. Conventional photoimaging and developing techniques as described above are used to image and develop the second photoresist material layer 130.

After developing the second photoresist material layer 150, the substrate 110 containing the layers 112 and 130 is optionally baked at temperature ranging from about 150° C. to about 200° C., preferably from about from about 170° C. to about 190° C. for about 1 minute to about 60 minutes, preferably from about 15 to about 30 minutes to prevent damage or warping of the second layer 130 during subsequent formation of the barrier walls described above. The glass transition temperature of the second layer 130 is about 175° C. which is above a dry film lamination temperature used to apply a third photoresist material layer 150 to the second layer 130.

Figure 16:
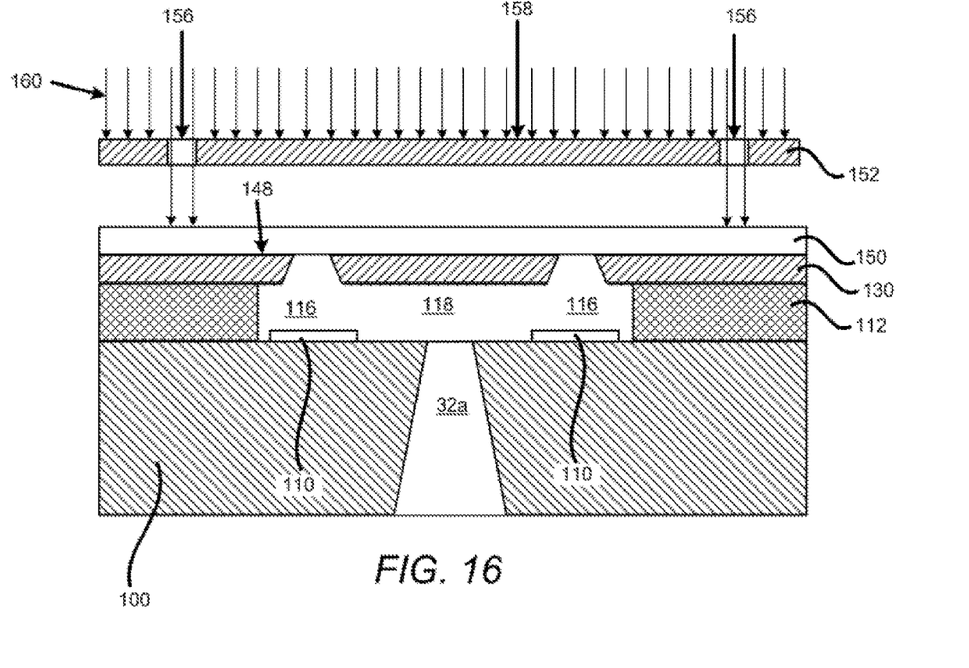
Figure 17:
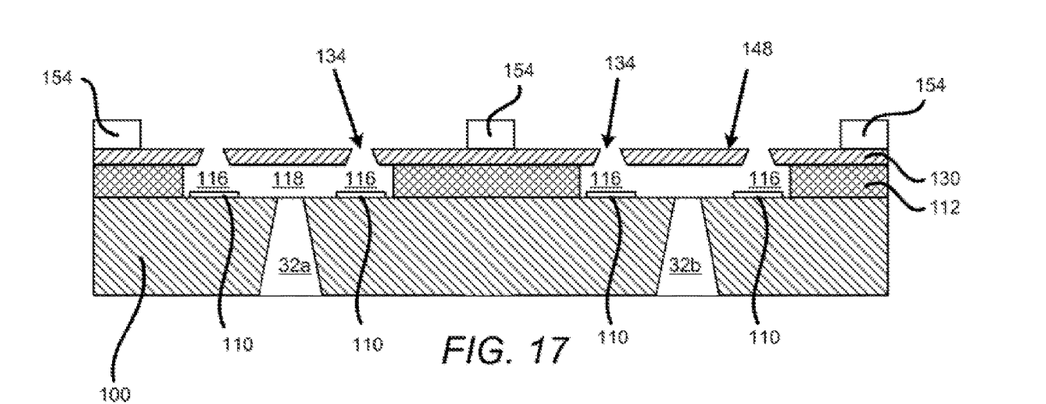

With reference now to FIGS. 16 and 17, a method for making the barrier walls on an exterior surface 148 of the second layer 130 is described. Subsequent to imaging and developing and, optionally, baking the second photoresist material layer 130, the third photoresist material layer 150 is laminated to the exterior surface 148 of the second layer 130 as shown in FIG. 16. The third photoresist material layer 150 is provided by a dry film photoresist material of the same formulation described above with respect to the second photoresist material layer 130. Accordingly, the third layer 150 is also derived from a di-functional epoxy compound, a relatively high molecular weight polyhydroxy ether, the photoacid generator described above, and, optionally, the adhesion enhancing agent described above.

A suitable formulation for providing the second and third photoresist material layers 130 and 150 is as follows:

TABLE 4

| Component | Amount in photoresist formulation (wt. %) |
|---|---|
| First di-functional epoxy component (EPON 1007F) | 9.6 |
| Second di-functional epoxy component (DIC 850 CRP) | 9.6 |
| Polyhydroxy ether (InChem PKHJ) | 12.8 |
| Diaryliodoniumhexafluoroantimonate (SARCAT 1012) | 7.2 |
| Glycidoxypropyltrimethoxysilane (Z-6040) | 0.3 |
| Cyclohexanone | 50 |
| Acetone | 10.5 |

The third photoresist material layer 150 is applied as a dry film laminate to the exterior surface 148 of the second photoresist material layer 130 after curing and developing and, optionally, baking the second layer 130. Accordingly, the foregoing components of the third photoresist material layer 150 may also be dissolved in a suitable solvent or mixture of solvents and dried on a release liner or other suitable support material. A solvent in which all of the components of the second photoresist material layer 150 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer 150.

As described above, the third photoresist material layer 150 may be laminated to the exterior surface 148 of the second layer 130 using heat and pressure at a temperature that is below the glass transition temperature of the second layer 130. Next a mask 152 is used to define the barrier walls 154 in the third layer 150. The mask 152 includes transparent areas 156 defining the barrier walls 154 in the third layer 150 Opaque areas 158 prevent actinic radiation indicated by arrow 160 from contacting the third layer 150 in an area of the layer 150 to be removed, while the transparent areas 156 of the mask 152 enable the actinic radiation to cure the areas of the third layer 150 that will remain to provide the barrier walls 154. Upon developing the third photoresist material layer 150 with a suitable solvent as described above, the barrier walls 154 are formed on the exterior surface 148 of the second layer 130 as shown in FIG. 17. Conventional photoimaging and developing techniques as described above are used to image and develop the third photoresist material layer 150.

After developing the third photoresist material layer 150, the substrate 110 containing the layer 112, the layer 130, and the barrier walls 154 is optionally baked at temperature ranging from about 150° C. to about 200° C., preferably from about from about 170° C. to about 190° C. for about 1 minute to about 60 minutes, preferably from about 15 to about 30 minutes. A cross sectional view of an ejection head containing barrier walls 154 is illustrated in FIG. 17.

The barrier walls described above may not only prevent cross-contamination of fluids between adjacent arrays of nozzle holes, but the barrier walls may also prevent fluid from flooding the surface 148 of the nozzle plate and corroding contact pads used for electrical connection to the ejection head.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A nozzle plate of a fluid ejection head for a fluid ejection device, the nozzle plate comprising two or more arrays of nozzle holes therein and a barrier structure disposed on an exposed surface of the nozzle plate between adjacent arrays of nozzle holes, wherein the barrier structure deters cross-contamination of fluids between the adjacent arrays of nozzle holes, and wherein the barrier structure is derived from a second photoresist material layer laminated to the exposed surface of the nozzle plate, wherein the nozzle plate comprises a first photoresist material layer having nozzle holes imaged therein.

2. The nozzle plate of claim 1, wherein each barrier structure comprises a single wall imaged in the second photoresist material layer laminated to the nozzle plate.

3. The nozzle plate of claim 1, wherein each barrier structure comprises a plurality of walls imaged in the second photoresist material layer laminated to the nozzle plate.

4. The nozzle plate of claim 1, wherein the barrier structure has a height orthogonal to the nozzle plate ranging from about 25 to about 100 microns.

5. The nozzle plate of claim 1, wherein the barrier structure comprises a dry film photoresist layer laminated to the exposed surface of the nozzle plate.

6. The nozzle plate of claim 5, wherein the dry film photoresist layer comprises a negative photoimageable material layer.

7. A fluid ejection head for a fluid ejection device comprising the nozzle plate of claim 1.

8. A method for making an improved fluid ejection head for fluid ejection device, the method comprising the steps of:
  applying a first negative photoresist layer to a device surface of a semiconductor substrate, wherein the first negative photoresist layer is derived from a composition comprising a multi-functional epoxy compound, a first di-functional epoxy compound, a photoacid generator, an adhesion enhancer, and an aryl ketone solvent;
  imaging a plurality of flow features in the first photoresist layer;
  developing the imaged first photoresist layer to provide the plurality of flow features therein and a substantially planar thick film layer surface;
  applying a second negative photoresist layer to the thick film layer surface, the second negative photoresist layer having a thickness ranging from about 10 to about 30 microns and being derived from a second photoresist formulation comprising a second di-functional epoxy compound, a relatively high molecular weight polyhydroxy ether, the photoacid generator, the adhesion enhancer, and an aliphatic ketone solvent;
  imaging a plurality of nozzle holes in the second photoresist layer to provide at least two arrays of nozzle holes in the second negative photoresist layer;
  developing the imaged second photoresist layer to provide a photoresist nozzle plate on the thick film layer,
  laminating a third negative photoresist layer to an exposed surface of the nozzle plate, and
  imaging and developing the third negative photoresist layer to provide a barrier structure between adjacent arrays of nozzle holes, whereby cross-contamination of fluids between the adjacent arrays of nozzle holes is deterred.

9. The method of claim 8, wherein each barrier structure comprises a plurality of walls imaged in the third negative photoresist layer.

10. The method of claim 8, wherein each barrier structure has a height orthogonal to the nozzle plate ranging from about 25 to about 100 microns.

11. The method of claim 8, further comprising surface treating the nozzle plate with an oxygen plasma surface treatment and/or alkoxysilane compound prior to laminating the third negative photoresist layer to the exposed surface of the nozzle plate, to improve adhesion between the nozzle plate and the third negative photoresist layer.

12. A fluid ejection head for a fluid ejection device, the fluid ejection head comprising a nozzle plate having two or more arrays of nozzle holes therein and a barrier structure disposed on an exposed surface of the nozzle plate between adjacent arrays of nozzle holes, wherein the barrier structure deters cross-contamination of fluids between the adjacent arrays of nozzle holes, and wherein the barrier structure is derived from a second photoresist material layer laminated to the exposed surface of the nozzle plate, wherein the nozzle plate comprises a first photoresist material layer having nozzle holes imaged therein.

13. The fluid ejection head of claim 12, wherein each barrier structure comprises a single wall imaged in the second photoresist material layer laminated to the first photoresist material layer.

14. The fluid ejection head of claim 12, wherein each barrier structure comprises a plurality of walls imaged in the second photoresist material layer laminated to the first photoresist material layer.

15. The fluid ejection head of claim 12, wherein the barrier structure has a height orthogonal to the nozzle plate ranging from about 25 to about 100 microns.

16. The fluid ejection head of claim 12, wherein the barrier structure comprises a dry film photoresist layer laminated to the exposed surface of the nozzle plate.

17. The fluid ejection head of claim 16, wherein the dry film photoresist layer comprises a negative photoimageable material layer.

* * * * *